(12) United States Patent
Campbell

(10) Patent No.: US 12,312,190 B2
(45) Date of Patent: May 27, 2025

(54) CONTAINER HANDLING APPARATUS AND SYSTEM FOR INTERFACING WITH A TELESCOPING CONVEYOR

(71) Applicant: Reh Enterprises, LLC, Fishers, NY (US)

(72) Inventor: Colin A. Campbell, Guelph (CA)

(73) Assignee: Reh Sanders Enterprises, LLC, Fishers, NY (US)

( * ) Notice: Subject to any disclaimer, the term of this patent is extended or adjusted under 35 U.S.C. 154(b) by 329 days.

(21) Appl. No.: 17/886,525

(22) Filed: Aug. 12, 2022

(65) Prior Publication Data

US 2023/0045842 A1 Feb. 16, 2023

Related U.S. Application Data

(60) Provisional application No. 63/233,239, filed on Aug. 14, 2021.

(51) Int. Cl.
*B65G 67/08* (2006.01)
(52) U.S. Cl.
CPC ................................. *B65G 67/08* (2013.01)
(58) Field of Classification Search
CPC ...... B65G 41/007; B65G 15/12; B65G 15/26; B65G 37/005; B65G 67/08; B65G 67/20; B65G 21/14
USPC ........................................ 414/522, 523, 532
See application file for complete search history.

(56) References Cited

U.S. PATENT DOCUMENTS

| 3,836,021 | A | * | 9/1974 | McWilliams | .......... | B65G 67/08 |
| | | | | | | 414/398 |
| 5,009,560 | A | * | 4/1991 | Ruder | .................... | B65G 67/08 |
| | | | | | | 198/588 |
| 5,325,953 | A | * | 7/1994 | Doster | ................... | B65G 43/08 |
| | | | | | | 198/456 |
| 5,697,753 | A | * | 12/1997 | Aurora | ................... | B65G 67/08 |
| | | | | | | 414/398 |
| 2012/0097498 | A1 | * | 4/2012 | Campbell | .............. | B65G 13/12 |
| | | | | | | 198/588 |
| 2013/0277175 | A1 | | 10/2013 | Campbell et al. | | |

FOREIGN PATENT DOCUMENTS

| CA | 2718881 | 10/2010 |
| CA | 2854306 | 6/2014 |

OTHER PUBLICATIONS

Destuff-ITService and Maintenance Manual, Engineered Lifting Systems and Equipment, INC, 36 pages.

* cited by examiner

*Primary Examiner* — Glenn F Myers
(74) *Attorney, Agent, or Firm* — Duane C. Basch

(57) ABSTRACT

A conveyor apparatus removably connectable to an extendable conveyor, where mechanical interfaces, such as a pin-and-slot hitch, along with an electrical control interface, allow the conveyor apparatus to safely move, operate as well as control operation of the associated extendable conveyor for loading and unloading shipping containers such as truck trailers and the like.

21 Claims, 9 Drawing Sheets

CONTAINER HANDLING APPARATUS AND SYSTEM FOR INTERFACING WITH A TELESCOPING CONVEYOR

This application claims priority under 35 U.S.C. 119(e) from U.S. Provisional Patent Application No. 63/233,239 for a CONTAINER HANDLING APPARATUS AND SYSTEM FOR INTERFACING WITH A TELESCOPING CONVEYOR, by Colin A. Campbell, filed Aug. 14, 2021, which is hereby incorporated by reference in its entirety.

CROSS-REFERENCE

The following published US Patent Applications are hereby cross-referenced and the disclosures thereof incorporated herein by reference in their entirety: US Patent Publication No. 2012/0097498 A1, for CONVEYOR APPARATUS FOR UNLOADING PACKAGES FROM SHIPPING CONTAINERS, by Colin A. Campbell et al., published Apr. 26, 2012 (application Ser. No. 12/911,857, filed Oct. 26, 2010), and US Patent Publication No. 2013/0277175 A1, for CONVEYOR APPARATUS FOR UNLOADING PACKAGES FROM SHIPPING CONTAINERS, by Colin A. Campbell et al., published Oct. 24, 2013 (application Ser. No. 13/917,832, filed Jun. 14, 2013).

The embodiments disclosed herein relate to a conveying system for handling containers, and in particular, a conveyor apparatus removably connectable to an extendable conveyor, where mechanical and electrical interfaces allow the conveyor apparatus to safely move and control the operation of the telescoping conveyor and extending into shipping containers such as truck trailers for loading and unloading.

BACKGROUND AND SUMMARY

Modern supply networks utilize distribution centers to handle, sort and temporarily store products before distributing them to wholesalers, retailers, or directly to consumers. As a result, distribution centers receive and ship a vast amount of products on a daily basis and many of these products arrive and/or leave on transport trucks. These products are in packages or containers that are unloaded and loaded on trucks via a conveyor system, which may also facilitate sorting and routing of the packages to different areas within the distribution center for later handling. Previous, but still in many cases, these packages are unloaded and/or loaded using manual labor.

A continuing problem with many distribution centers is that employees can injure themselves while unloading the packages from truck trailers. For example, trailers are often filled with packages from the floor to ceiling and employees sometimes strain themselves when repeatedly bending over to pick up the lower packages, and/or reaching up to grab the upper packages. These repeated physical strains can cause short and long-term injuries. Even the seemingly simple task of carrying packages within a trailer can be hazardous, particularly with heavier packages. Accordingly, it is desirable to provide equipment that reduces health and safety concerns associated with the handling of packages while loading and unloading trailers.

One solution is to provide equipment that assists employees while loading and unloading packages from trailers. Many of these solutions utilize an extendable conveyor that can be positioned inside the trailer so that an employee can pick and place packages on the extendable conveyor without having to carry the package out of the trailer. The extendable conveyor then transports the package to a conveyor system within the distribution center. As used herein, the term "extendable", as applied to a conveying apparatus, includes various mechanical assemblies and methods for extending the length or footprint of the conveying apparatus, for example, telescoping and expandable or flex conveyors.

One example of an extendable conveyor is described in U.S. Pat. No. 6,431,346 (Gilmore et al.). Other equipment that is used in such situations are the Destuff-IT™ Unloader (Model: DTU & DTUM) and Restuff-IT™ Loader (Model: DTB) by Engineered Lifting Systems & Equipment Inc. of Elmira, Ontario, Canada. For example, aspects of such equipment may be described in published US patent applications US 2012097498 A1 for CONVEYOR APPARATUS FOR UNLOADING PACKAGES FROM SHIPPING CONTAINERS by Campbell et al., filed Oct. 26, 2010, and US 2013277175 A1 for CONVEYOR APPARATUS FOR LOADING OR UNLOADING PACKAGES FROM SHIPPING CONTAINERS by Campbell et al., filed Jun. 14, 2013, both of which are hereby incorporated by reference in their entirety. Improvements in the features and operability of such systems, including the ability to drive and control the associated extendable conveyor are intended to improve the functionality and operating efficiency of the conveying systems.

Accordingly, there is a need for an improved conveyor apparatus, which overcomes disadvantages associated with the manual loading and unloading process as well as early conveying systems.

Disclosed in embodiments herein is a conveying apparatus comprising: a material-handler including at least one conveying assembly for exchanging containers with a free end of an extendable conveyor to facilitate the transfer of containers between an operator and the extendable conveyor, at least one drive mechanism for moving the material handler over a surface in response to control signals, and a compliant hitch mechanism removably connecting said material handler to, and applying a driving force for, the free end of the extendable conveyor.

Further disclosed in embodiments herein is a kit for interfacing a material handler to a free end of an extendable conveyor, comprising: a first hitch assembly, including a vertical pin, attachable to the free end of the extendable conveyor; and a second hitch assembly attachable to the material handler, said second hitch including an arcuate slot therein for receiving said vertical pin, wherein the second hitch, in response to powered movement of the material handler, applies a horizontal force to the pin in a direction parallel with a longitudinal axis of the extendable conveyor, thereby moving (e.g., extending and/or retracting) the free end of the extendable conveyor in response to movement of the material handler.

Also disclosed herein is a system for operating a conveying apparatus having an extendable conveyor comprising: a material-handler including at least one conveying assembly for exchanging containers with a free end of the extendable conveyor to facilitate the transfer of containers between an operator using the material handler and the extendable conveyor, at least one drive mechanism for moving the material handler over a surface in response to control signals; a compliant hitch mechanism removably connecting said material handler to, and providing driving force for, the free end of the extendable conveyor; said conveying assembly including at least one adjustable conveyor having a driven belt to transport containers thereon, said adjustable conveyor having a free end adjacent an operator location, where a position of the free end of the adjustable conveyor is adjustable by the operator, and a mid-conveyor having a driven surface suitable to exchange containers with said at least one adjustable conveyor, wherein the at least one adjustable conveyor includes a slewing conveyor section coupled to a frame of the material handler for pivotal movement about a generally vertical axis and for pivotal movement about a generally horizontal axis, and where an opposing free end is shaped for the exchange of containers by an operator, the slewing conveyor section being movable from side-to-side by pivoting the slewing conveyor section about the vertical axis, and movable vertically by pivoting the slewing conveyor section about the horizontal axis independent of the adjustable conveyor section; an inclined belt conveyor operatively coupled to the free end of the extendable conveyor, and suitable for the unassisted exchange of containers between the extendable conveyor and the inclined belt conveyor; a transfer conveyor, operatively attached to and positioned at an upper end of the inclined belt conveyor, the transfer conveyor suitable for transporting containers between the inclined belt conveyor and the mid-conveyor; at least one cable providing a source of power to the material handler and for interconnecting the control electronics of the material hander to the extendable conveyor; and at least one motor-driven cable reel for winding and unwinding the at least one cable, where the motor-driven cable reel operates automatically, in response to movement of the material handler, to unwind and wind the at least one cable at the same time the extendable conveyor is extended and retracted.

Disclosed in embodiments herein is a material handler for use with a source of conveyed packages, comprising: at least one adaptable conveying assembly for exchanging containers with the source of conveyed packages; at least one drive mechanism for moving the material handler over a surface in response to control signals; a mechanism for connection of the material handler to the source of conveyed packages; and at least one cable providing a source of power to the material handler and interconnecting controls of the material hander to the source of conveyed packages.

Figure 1:
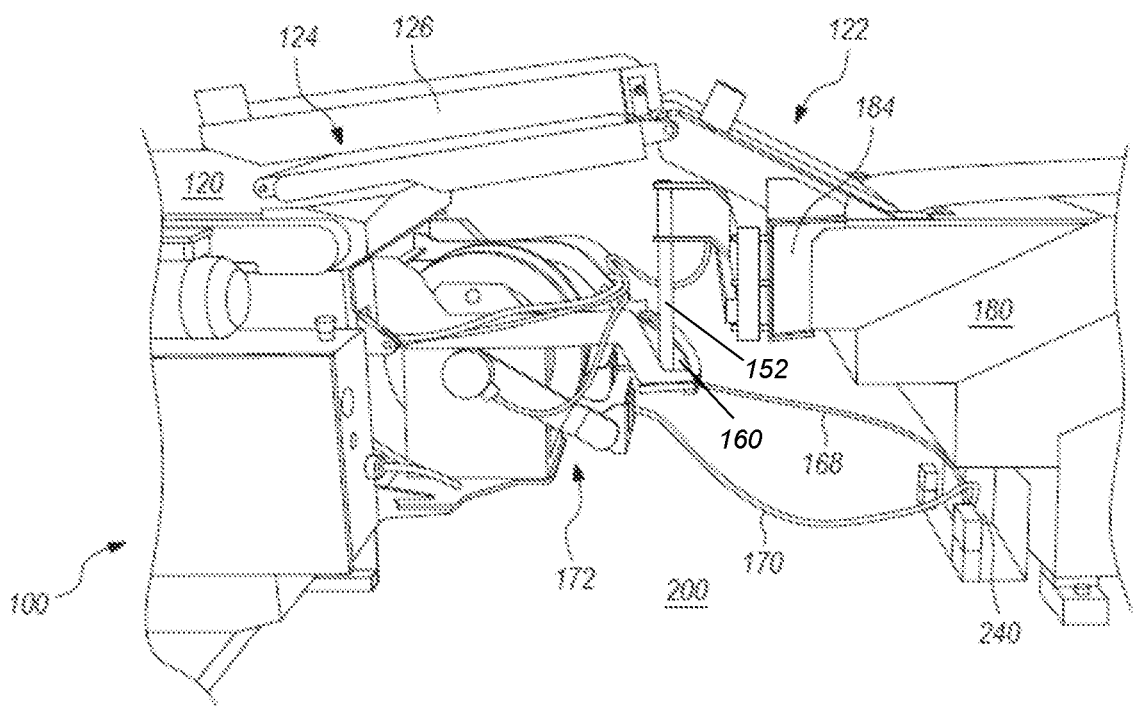
FIG. 1 is a partial side view of a conveying apparatus in accordance with one embodiment of a conveying system.

The various embodiments described herein are not intended to limit the disclosure to those embodiments described. On the contrary, the intent is to cover all alternatives, modifications, and equivalents as may be included within the spirit and scope of the various embodiments and equivalents set forth. For a general understanding, reference is made to the drawings. In the drawings, like references have been used throughout to designate identical or similar elements. It is also noted that the drawings may not have been drawn to scale and that certain regions may have been purposely drawn disproportionately so that the features and aspects could be properly depicted.

DETAILED DESCRIPTION

Figure 2:
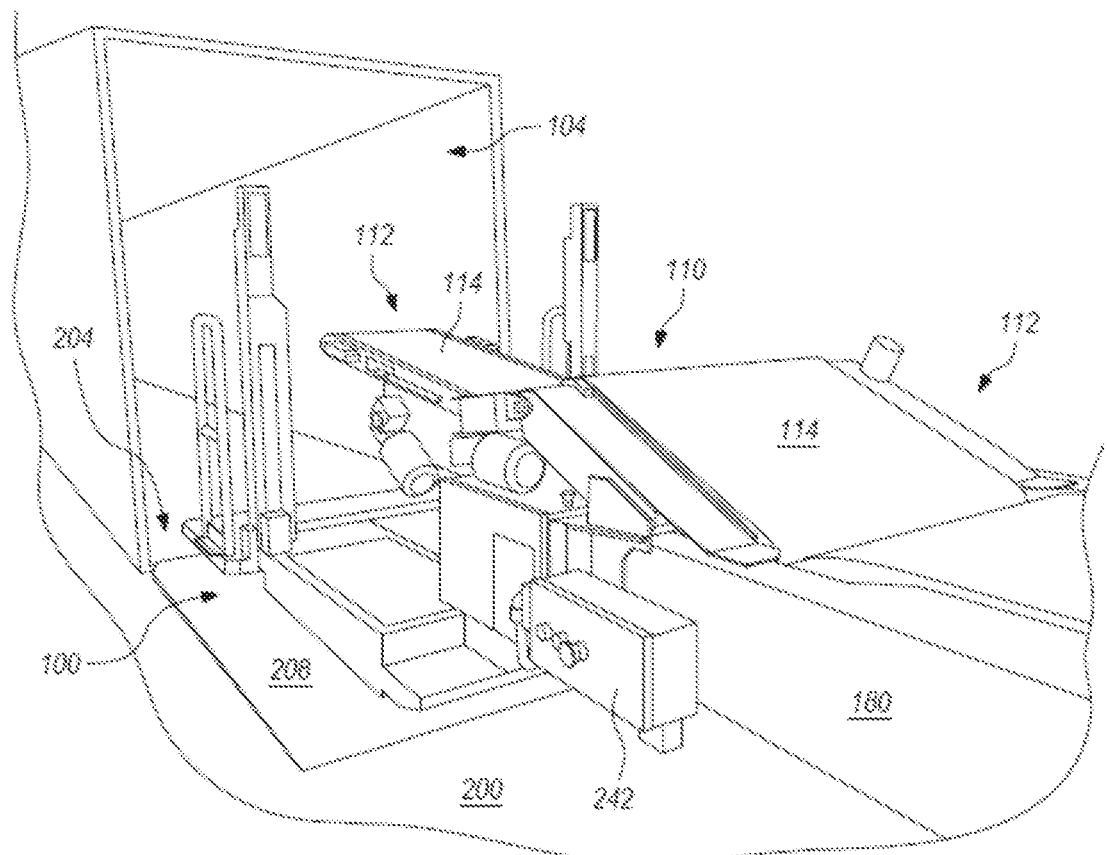
FIG. 2 a partial perspective view of the conveying apparatus from a different position showing the conveying system one a ramp leading to a trailer for loading.

Referring, initially, to FIGS. 1 and 2, depicted therein are partial perspective views of an embodiment of the conveying apparatus. In a general sense, the conveying apparatus incudes a material handler 100 having at least one conveying assembly 110 for exchanging containers with the extended or free end of extendable conveyor 180. As will be appreciated, such an apparatus may be employed to facilitate the transfer of containers such as boxed packages and the like (not shown) between the material handler 100 and the extendable conveyor 180. In operation, an operator would stand and move about platform 128 located at the front end of the material handler, where the material handler is maneuverable to permit its travel into and out of a transport vehicle such as an enclosed tractor-drawn trailer 104, intermodal container, or the like. Moreover, as will be disclosed in further detail below, the material handler 100 is operatively attached to the extendable conveyor 180 using a compliant hitch assembly 150 (FIGS. 6-8) in order to physically link or mechanically interconnect the material handler to the extendable conveyor in order to move the end of the extendable conveyor. As will be discussed in more detail below, an electrical/control interface is also employed so that the material handler can act as a master, controlling both movement and operation of the extendable conveyor.

Figure 3:
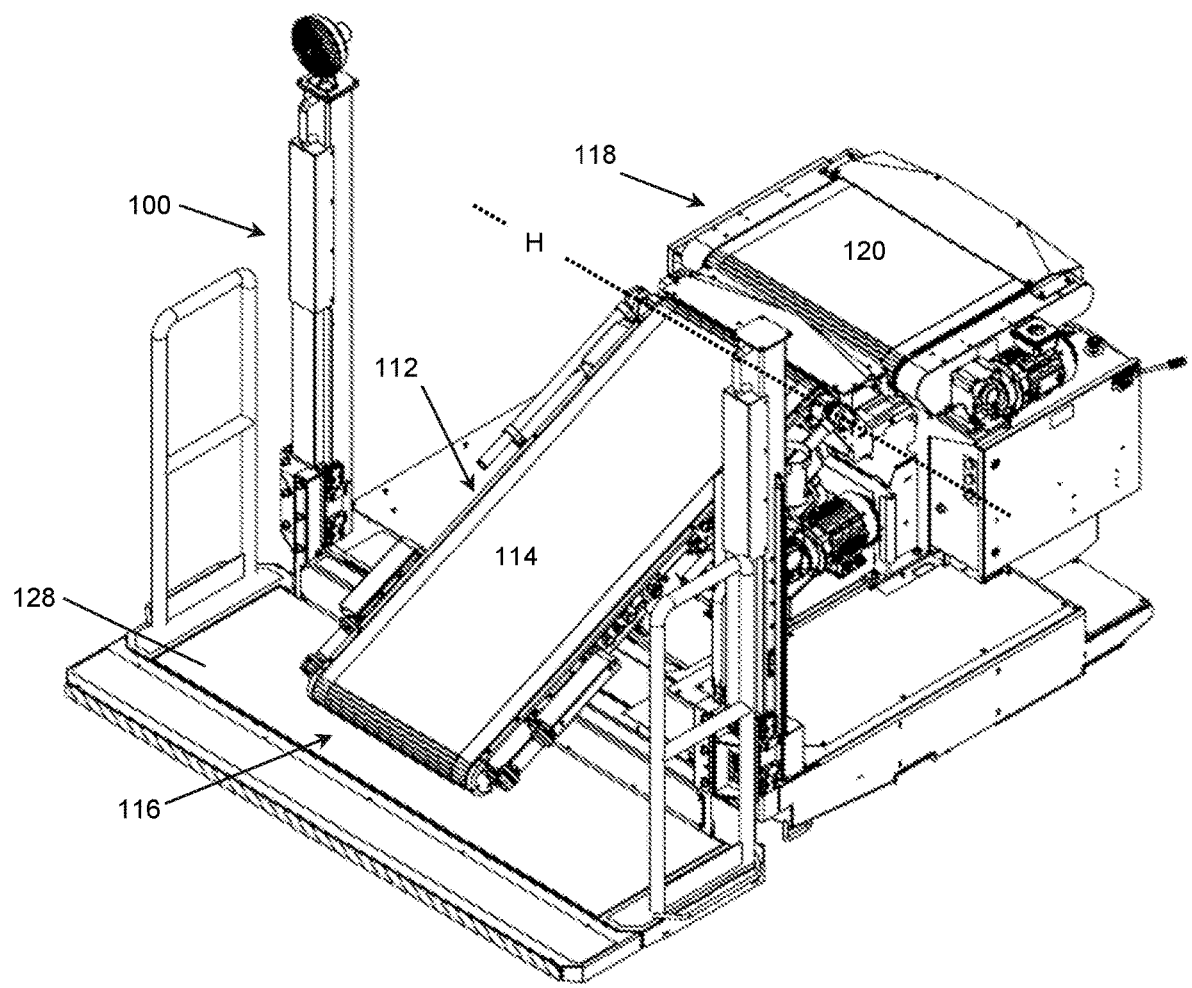
FIGS. 3-5 are, respectively, perspective, front and side views of a material handler in accordance with one embodiment of the conveying system.
Figure 4:
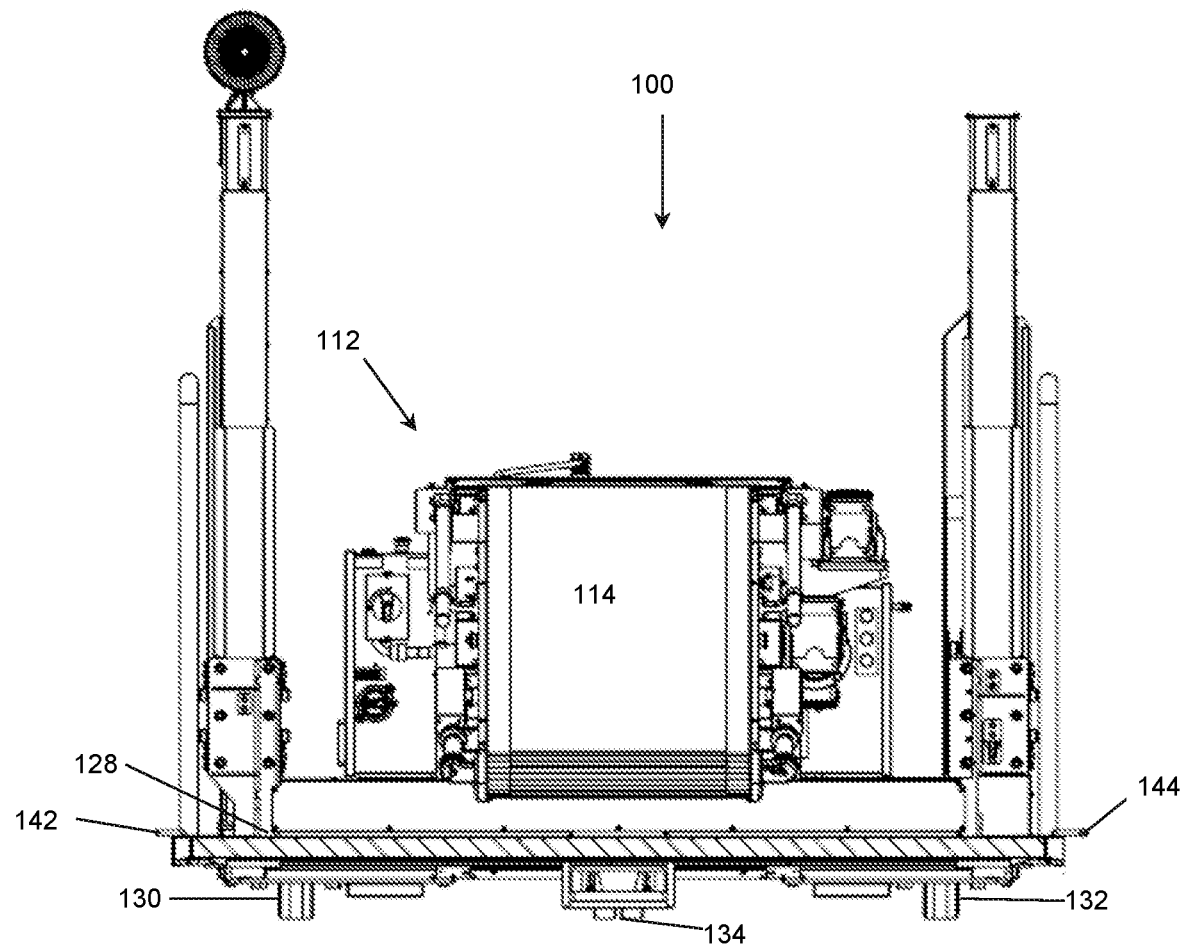
Figure 5:
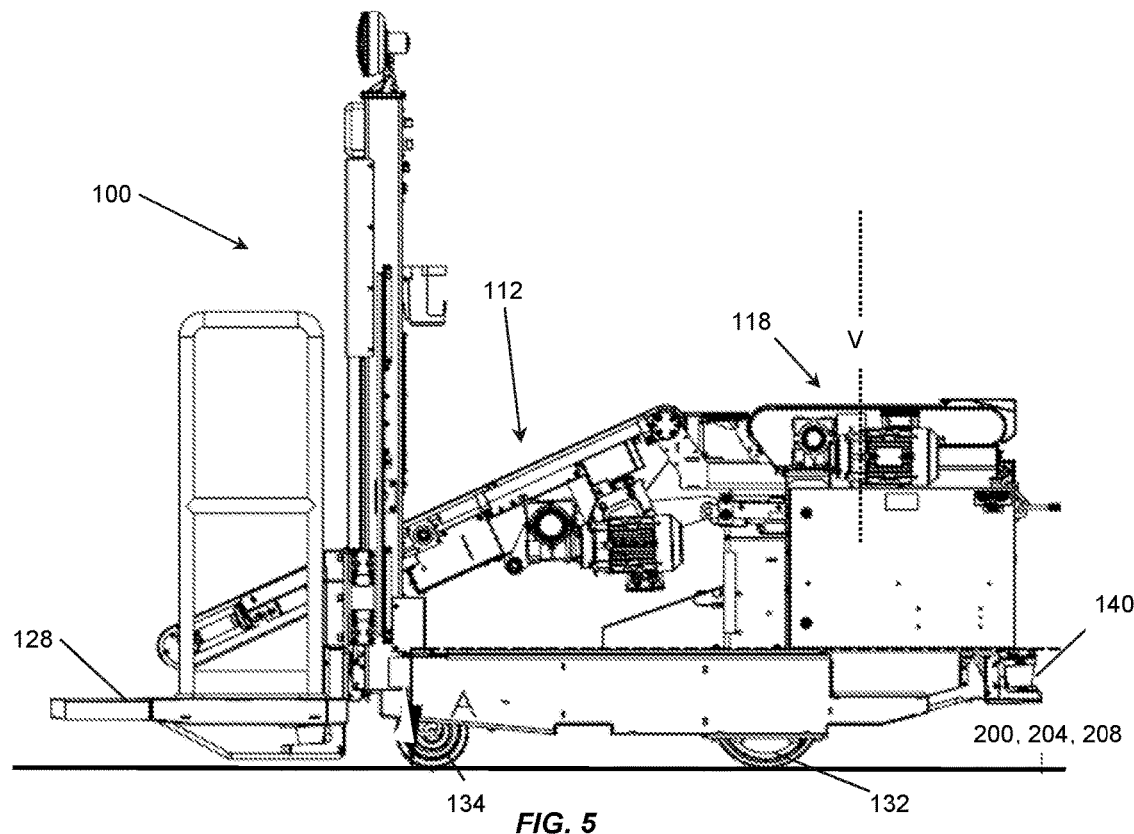

Referring also to FIGS. 3-5, material handler 100 further includes a drive mechanism, which may employ at least one pair of drive wheels 130, 132 extending under and supporting the handler, where controlling the rotation of each of the drive wheels separately (via separate drive motors in a dual-drive wheel embodiment) results in the maneuvering and steering of the material handler. The drive wheels remain in contact with the loading area floor 200, the trailer or container bed 204 as well as the ramp 208 providing a transition therebetween, and the drive wheels control the movement and position of the material handler over such surfaces in response to operator and sensor inputs. The material handler further includes a pivoting set of caster wheels 134 for supporting a front portion rear thereof. In one embodiment, a drive mechanism for moving the material handler includes a pair of drive wheels 130 and 132, driven by DC motors (e.g., ¾ HP) under the control of a controller 300, such as a programmable logic controller (e.g., Schneider Modicon M241 Mico PLC). It will be appreciated that alternative driving mechanisms may be employed including a single steerable drive wheel, a driven ball-wheel drive, etc.

Movement of the material handler 100 is typically under the control of an operator and is subject to the over-ride or control inputs of a plurality of sensors, such as optical scanners 140, 142 and 144. It will be appreciated that mechanical sensors may be employed in addition to or as alternatives to the optical sensors. The sensors detect the presence of obstacles and allow the material handler to avoid collision with truck or container walls and other objects near the material handler, particularly as the handler is maneuvered.

Figure 6:
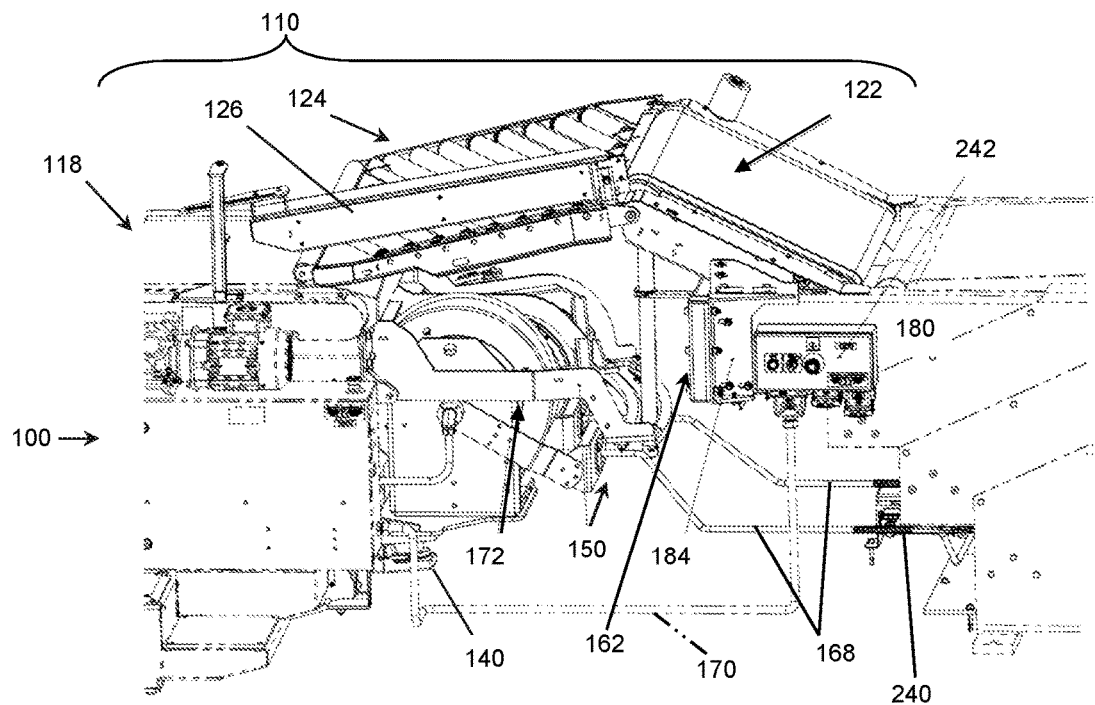
FIG. 6 is a side perspective view of the material handler detachably connected to the end of an extendable conveyor using a compliant hitch assembly.
Figure 7:
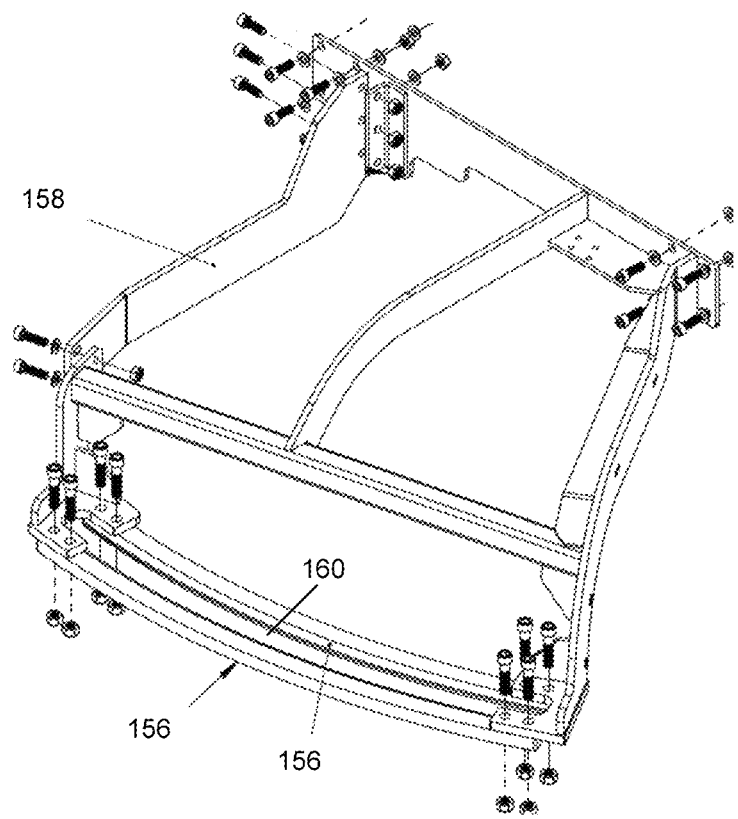
FIGS. 7-8 are perspective views of the compliant hitch assembly components.
Figure 8:
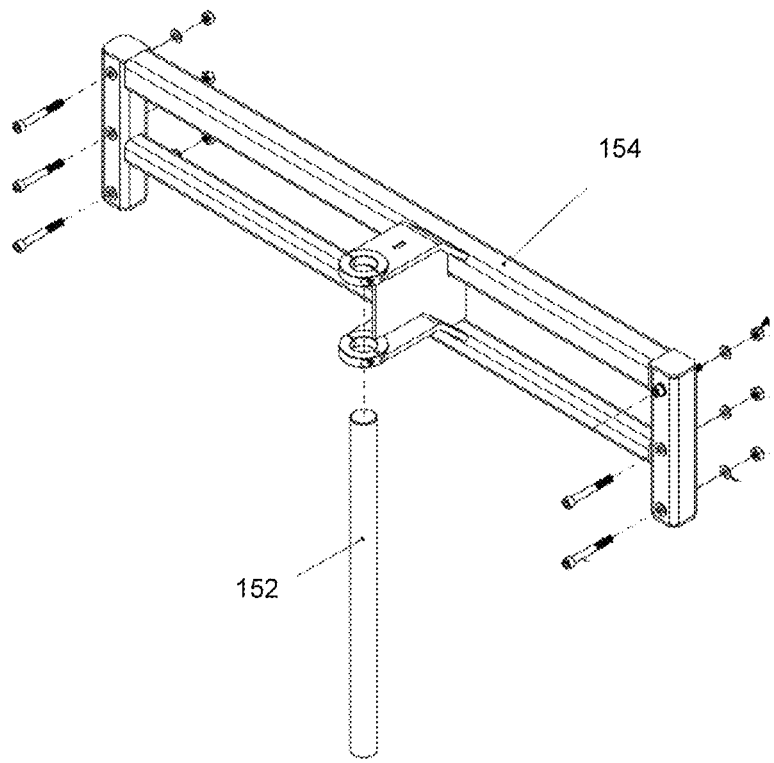

Referring also to FIGS. 6-8, material handler 100 is operatively coupled to telescoping conveyor 180 using a compliant hitch 150 including a pin-and-hitch assembly. The extendable conveyor employed may be sourced from various companies. However, the disclosure set forth herein is directed to operative interconnection of the material handler 100 to, for example, an FMH (Jonesboro, AR USA) MaxxReach® telescopic conveyor.

In one embodiment of the compliant hitch mechanism, the pin-and-hitch assembly includes a generally vertical pin 152 passing through a slot 160 created between a pair of arcuate plates 156. The vertical pin 152 is connected to a free end of the extendable conveyor using a bolted-on first weldment 154. The horizontal slot 160 is formed between a pair of arcuate plates 156 attached via a second weldment 158 that is bolted on to the back end of the material handler 100 so that the slot formed between plates 156 is spaced away from the rear of the material handler, thereby avoiding contact between components of the material handler and the extendable conveyor. The arcuate plates 156 form the slot 160 between them, and the slot is shaped along an arc having a radius that approximates the turning radius of the material handler 100, so that the maneuvering of the material handler 100 will result in the pin 152 sliding laterally within the slot 160 and will not place undue lateral force on the end of the extendable conveyor 180 that is hitched or connected to the material handler. The pin-and-hitch assembly 150 removably connects the material handler and provides a driving force for the free end of the extendable conveyor in order to assure that the end of the extendable conveyor 180 is maintained at a spacing/position that allows for the exchange of containers therebetween. Moreover, the length of the pin 152, along with placing the arcuate plates 156 at or near a mid-point of vertical travel for the back end of the material handler, assures that once "hitched" the pin will be retained within the slot to assure that the connection between the handler and conveyor end is maintained as the material handler travels in and/or out of the trailer or shipping container traversing the different surfaces 200, 204 and 208. As disclosed herein as a pin-and-slot mechanism, the compliant hitch may also be accomplished using alternative mechanical components to ensure no side loading gets applied to the extendable (e.g., telescoping) conveyor to prevent damage to it. In the depicted embodiments, if the pin 152 is offset within the slot 160 by driving away from the longitudinal axis 424 of the extendable conveyor 180 (see e.g., FIG. 12), the pin is still only pulled forward (or pushed backward) by the by the arcuate plates 156.

In one embodiment of the conveying apparatus, the material handler has a conveying assembly 110 that includes at least one adjustable conveyor 112 having a driven belt 114 to transport containers thereon. The adjustable conveyor has a free end 116 toward the front of the material handler and adjacent an operator location on platform 128, where the position of the free end 116 of the adjustable conveyor (e.g., elevation and lateral positions) is adjustable by the operator. The conveying apparatus 110 also includes a mid-conveyor section 118 having a driven surface 120 suitable to exchange containers with the adjustable conveyor 112. One or more of the adjustable conveyors may be adjusted and maintained in position by a hydraulic system (not shown) employing extendable cylinders to alter the position and/or angle of such conveyors and to maintain the position once adjusted.

The mid-conveyor 118 may be a slewing conveyor section 120 pivotally coupled to a frame of the material handler 110 for pivotal movement about a generally vertical axis V (FIG. 5), and the adjustable conveyor includes a tiltable conveyor section 112 having one end thereof pivotally coupled to the slewing conveyor section 120 for pivotal movement about a generally horizontal axis H (FIG. 3), and an opposing free end shaped for the exchange of containers by an operator. As will be appreciated from FIGS. 1-3 and 6, for example, tiltable conveyor section 114 may be moved horizontally by an operator pivoting the slewing conveyor section about the vertical axis and moved vertically by pivoting the end 116 of the tiltable conveyor section 112 about the horizontal axis independent of the slewing conveyor section.

The conveying assembly 110 of the material handler 100, may further include an inclined belt conveyor section 122 operatively coupled to the free end 162 of the extendable conveyor 180. Conveyor section 122 includes a belt conveying surface that is operated at a speed suitable for unassisted exchange of containers with the extendable conveyor 180. Conveying assembly 110 also includes a transfer conveyor 124, operatively attached to and positioned at an upper end of the inclined belt conveyor, the transfer conveyor being a roller-type conveyor suitable for transporting containers between the inclined belt conveyor and the mid-conveyor 118. The transfer conveyor may also include an adjustable side guide or rail 126 that serves to assure that containers moving down the rollers of transfer conveyor 124 are properly positioned or aligned for exchange onto the mid-conveyor surface. The side guide may be attached and positioned along either side of the transfer conveyor 124. It should be understood that the side guide 126 may be otherwise operatively associated to the material handler 100 or part of conveying assembly 110 in order to adjust or modify the position of the slide guide relative to the transfer conveyor 124 as a function of the relative angular relationship between the material handler and the end of the extendable conveyor. For example, the forward or lower end of the side guide 126 would be positioned in a nominal position laterally if the material handler is in alignment with the extendable conveyor, whereas the lower end of the side guide would be moved laterally to the left or right when the material handler 100 is pivoted relative to the extendable conveyor 180. Such movement of side guide 126 is intended to assure that a container being exchanged between the extendable conveyor 180 and the conveying assembly 110 is properly oriented and proceeds to be exchanged between the mid-conveyor 118 and tiltable conveyor section 112 without human intervention.

The material handler 100 may further include an operator platform(s) 128 that may be adjustable in elevation (height) to permit an operator(s) to ergonomically stand on the platform to load and unload containers between the end of the tiltable conveyor section 112 and a stack of containers (not shown) in the trailer or shipping container. In this manner, the material handler facilitates the efficient loading and/or unloading of the trailer or shipping container.

Having described several aspects of the conveying apparatus including material handler 100 and extendable conveyor 180, attention is now turned to an embodiment of a kit including components necessary for interfacing the material handler to the free end of an extendable conveyor. In such an embodiment, the kit may include or consist of a first mechanical hitch assembly such as depicted in FIG. 8, which includes both a vertical pin 152 attachable to the free end of the extendable conveyor 180 using weldment 154, and a second hitch assembly as depicted in FIG. 7 attachable to the back or rear of material handler 100. The second hitch assembly including a pair of arcuate plates 156 held in place by a second weldment 158 and forming a slot 160 therebetween for receiving the vertical pin as illustrated in FIG. 6.

Once mechanically connected the arcuate plates 156 of the second hitch assembly, in response to powered movement of the material handler 100, apply a horizontal force to the pin 152 of the first assembly in a direction that is generally parallel with the longitudinal axis of the extendable conveyor 180. In this way the material handler is capable of moving (e.g., extending and/or retracting) the free end 162 of the extendable conveyor 180.

The first hitch assembly may further connect to a conveying assembly having components such as metal bracket(s) 184 for operatively connecting inclined belt conveyor section 122 to the extendable conveyor 180 and at least partially supporting the inclined belt conveyor section thereon. As will be appreciated, the conveying assembly serves as a bridge to move containers between the free end of the extendable conveyor and the adjustable conveyor of the material handler. In one embodiment of the kit, the pin of the first hitch assembly has a usable length of at least 25.4 cm (10 inches), and more likely approximately 48.25 cm (19 inches), and the radius of the arcuate slot of the second hitch assembly approximates the turning radius of the material handler. In one embodiment, the turning radius of the material handler, and thus the radius of the arcuate horizontal slot 160 is approximately 51.53 cm (20.3 inches). In this manner the hitch assembly is able to maintain mechanical connection between the material handler and the end of the extendable conveyor across surfaces of differing heights and angles, particularly in a loading dock having ramps and such to access trailer or transport containers.

In addition to the hitch assemblies, the kit may also include the conveying assembly with the inclined belt conveyor 122 for moving containers along with transfer conveyor 124. In combination not only do conveyor sections 122 and 124 bridge a gap between the extendable conveyor 180 and the material handler 100, but they transport containers as noted above. And, side guide 126 may be included in the kit to align containers for unassisted exchange with the adjustable conveyor.

The kit embodiment may further include an electrical control interface suitable for connecting control electronics of the material hander to those of the extendable conveyor so that the material handler controls at least one operation of the extendable conveyor. For example, the operation of the material handler, and in particular its conveying sections or surfaces may similarly result in the control of the extendable conveyor's conveying surface, so that when the material handler conveyor is stopped or started the extendable conveyor is similarly stopped or started.

In the various embodiments it is imperative that the operations of the material handler 100 and the extendable conveyor 180 are integrated in order to assure that the operation of the material handler is coordinated with operation of the container conveying system. Portions of the exemplary electrical control interface 230 are depicted in, for example, FIGS. 2, 6, 9 and 10. Certain control components operator-responsive switches and controls may be placed in panels or boxes such as panels 240 and 242.

Interconnection of the material handler and the extendable conveyor is accomplished in the depicted embodiments via cables. In one embodiment, panel 240 includes connections for the cables 168 and/or 170 in order to provide a hardwired interface between the material handler and extendable conveyor 180. Although not shown, it is contemplated that at least some of the control signals of the interface may be accomplished via radio-frequency communications channels, including Bluetooth, Wi-Fi, etc., using conventional transceivers. A hardwired interconnection may be preferable in order to minimize or avoid signal interference or disruption for co-located equipment. In the hard-wired configuration shown, at least one cable 168 provides a source of power to the material handler and interconnection of the control electronics of the material hander to the extendable conveyor. Furthermore, at least one spring- or motor-driven cable reel 172 is used for winding and unwinding the cable(s), where the cable reel operates automatically, in response to movement of the material handler, to unwind and wind the cable(s) at the same time the extendable conveyor is extended and retracted. Also depicted is a second cable 170 providing a connection for the exchange of control signals between the material handler 100 and the extendable conveyor 180. As noted above, this wired connection may be accomplished within one of the cables that are coiled on the cable reel, and/or wireless communications.

Figure 9:
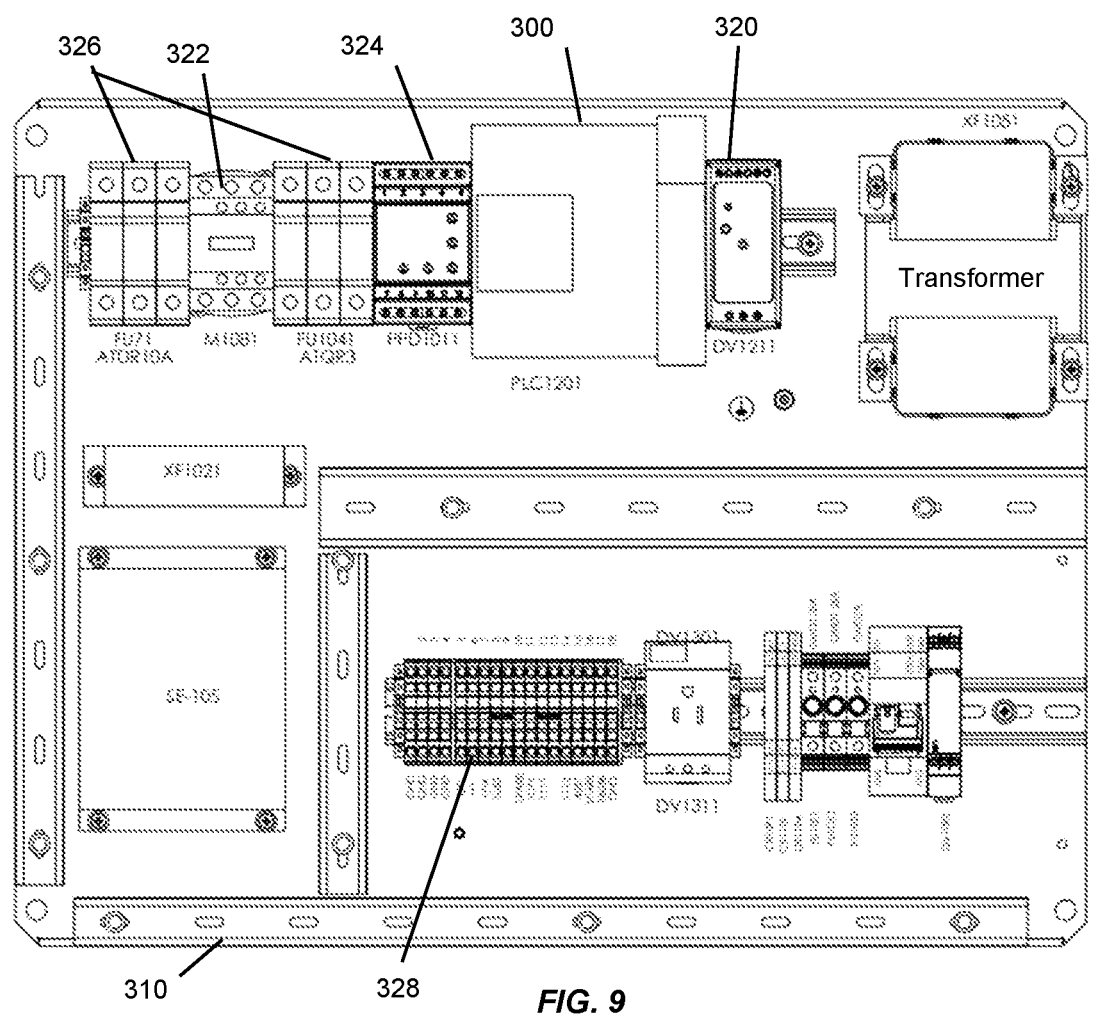
FIGS. 9 and 10 are, respectively, block and schematic diagrams of control elements used to integrate various components of the system for operating a conveying apparatus having an extendable conveyor.
Figure 10:
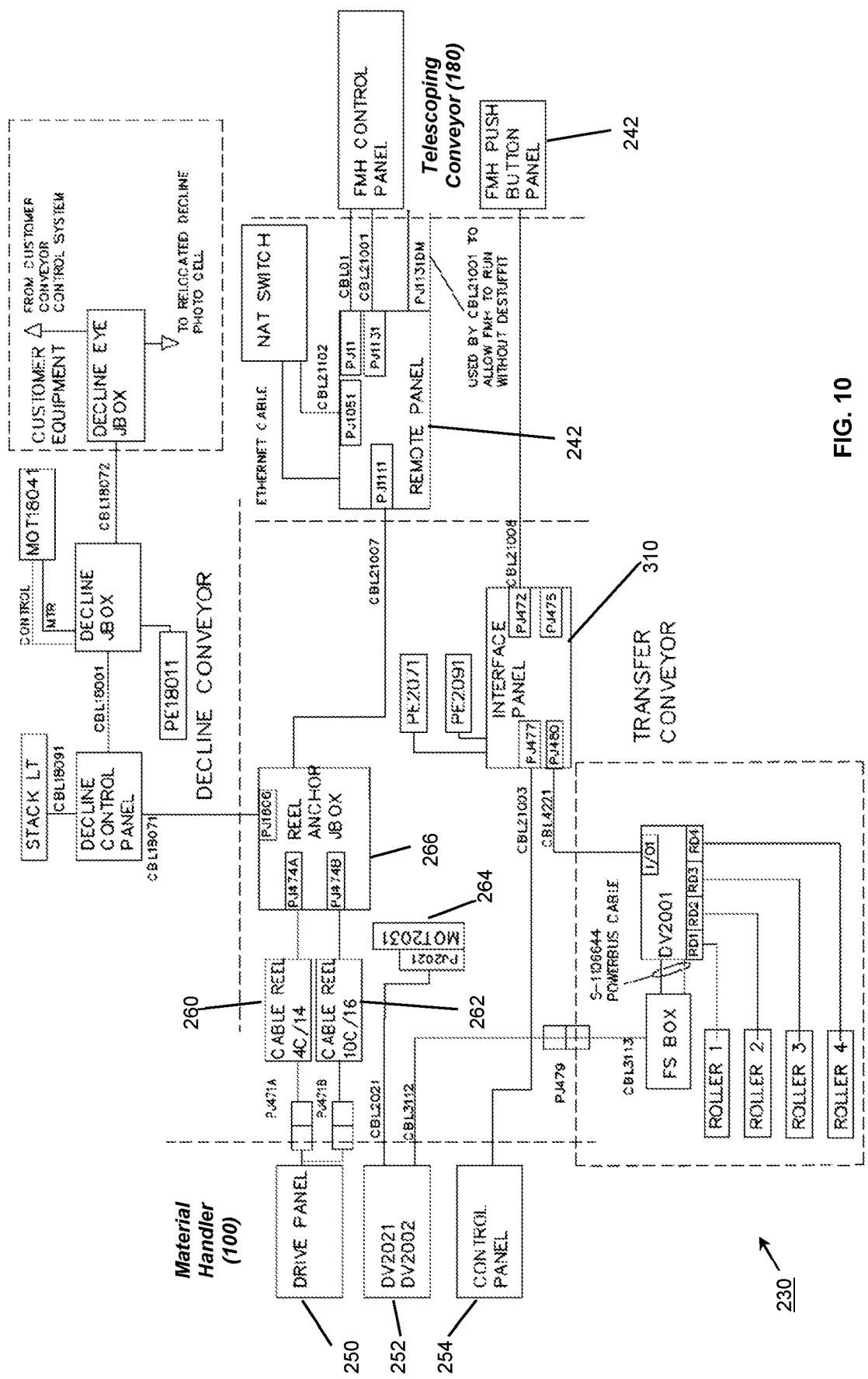

Referring to FIGS. 9 and 10, depicted therein are additional details of controller 300 operatively connected as part of the associated electrical control interface 230. Programmable controller 300 (e.g., PLC AB CompacLogix 600KB 2-Ethernet) includes a power supply 320, input and output circuits, and a processor. The controller is housed within a panel or electrical component box 310. Control panel box 310 further includes contactors 322 (e.g., Contactor Motor Control #LC1D18G7), relays 324, variable fuses 326, ground-fault relay 328 (e.g., Littelfuse #SE-105) and related components for controlling the operation of motors such as a transfer conveyor drive motor(s), and terminal block 328 for I/O connections, for electrical connection and control of the related functionality of the material handler 100 and extendable conveyor 180.

In the schematic diagram of FIG. 10, the various upper-level components are illustrated for the control interface 230. For example, the material handler 100 interface includes a drive panel 250 with controls for driving of the material handler and their interface to the cable reel controls and extendable conveyor 180, along with transition conveyor drive controllers 252 with associated power supplies, and a control panel 254 that includes electronics for integrating the remaining controls (e.g., sensors) of the material handler with the extendable conveyor. The cable reel controls include reels 260 and 262 and associated drive motor 264 for the motor-drive cable reels embodiment, along with the cable reel junction box 266. As will be appreciated, the cable reels are controlled as a function of the movement of the material handler 100, particularly with regard to the longitudinal extension and retraction of the extendable conveyor 180. Thus, the length and speed of winding (coiling) and unwinding (uncoiling) of the coil reels is a function of the extendable conveyor's respective extension and retraction while operatively hitched to and under the control of the material handler.

Figure 11:
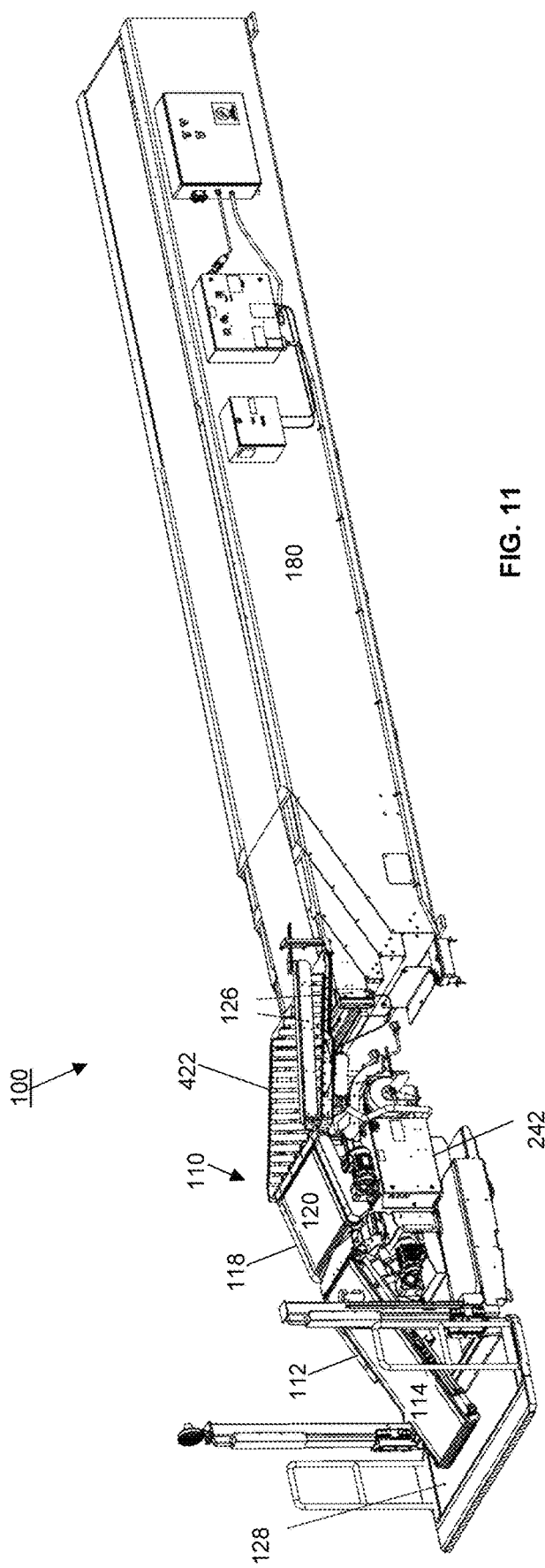
FIGS. 11-13 are, respectively, perspective, top and side views of a material handling system in accordance with an embodiment for unloading a trailer.
Figure 12:
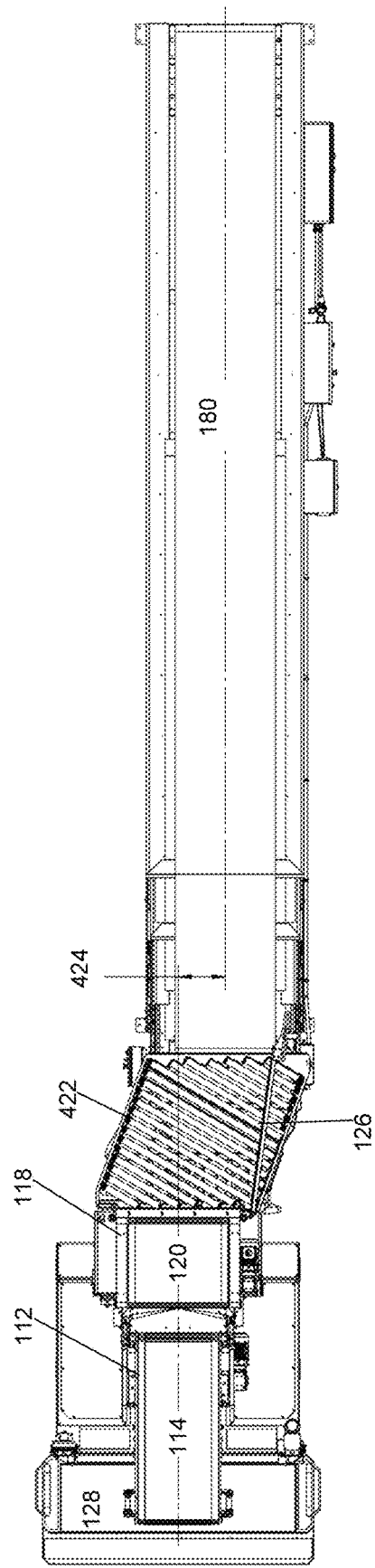
Figure 13:
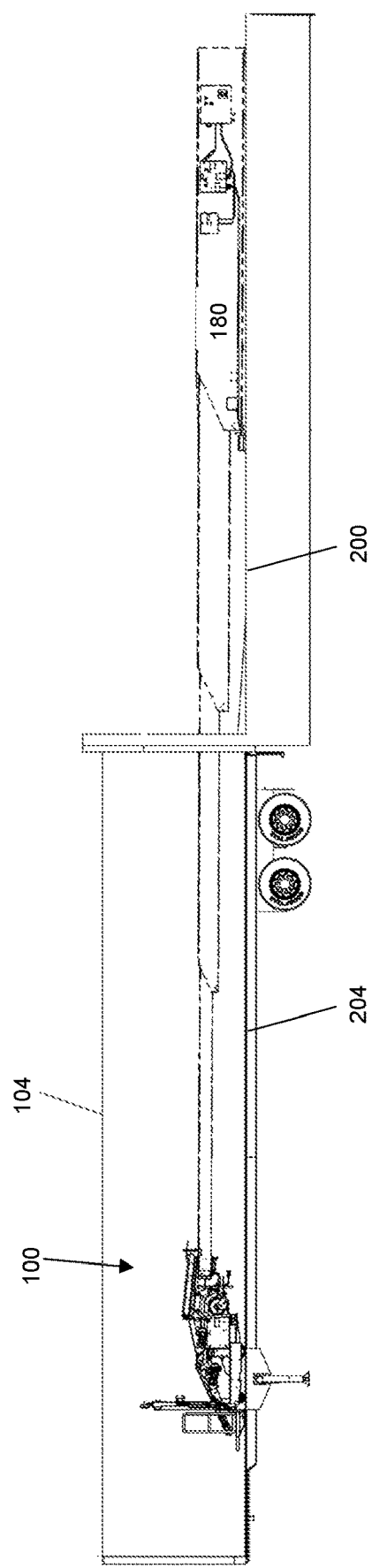

In the alternative embodiment depicted in FIGS. 11-13, a material handling system may similarly be provided to facilitate unloading of cargo such as packages or similar items from a trailer 104 onto an extendable conveyor 180. In one embodiment of the conveying apparatus, the material handler has a conveying assembly 110 that includes at least one adjustable conveyor 112 having a driven belt 114 to transport containers thereon. As previously described the adjustable conveyor has a free end adjacent an operator location on platform 128, where the elevation and lateral position of the free end is adjustable by the operator. The conveying apparatus 110 also includes a mid-conveyor section 118 having a driven surface 120 suitable to exchange or receive containers with the adjustable conveyor 112. One or more of the adjustable conveyors may be adjusted and maintained in position by a hydraulic system (not shown)

employing extendable cylinders to alter the position and/or angle of such conveyors and to maintain the position once adjusted.

As with the loading version of the conveying assembly 110 disclosed above, the mid-conveyor 118 may be a slewing conveyor section 120 pivotally coupled to a frame of the material handler 110 for pivotal movement about a generally vertical axis. The conveying assembly 110 of the material handler 100, may further include an inclined roller conveyor section 422 operatively coupled to the free end 162 of the extendable conveyor 180. Conveyor section 422 includes a roller or similar conveying surface that is operated at a speed suitable for unassisted exchange of containers between mid-conveyor section 118 and the extendable conveyor 180. Conveyor section 422 may also include an adjustable side guide or rail 126 that serves to assure that containers moving along or down the rollers of conveyor section 422 are properly positioned or aligned for exchange onto the extendable conveyor's surface. The side guide may be attached and positioned along either side of the conveyor section 422. As previously disclosed the side guide 126 may be otherwise operatively associated to the material handler 100 or part of conveying assembly 110 in order to adjust or modify the position of the side guide relative to the conveyor section 422 as a function of the relative angular relationship between the material handler and the end of the extendable conveyor. The material handler 100 similarly includes an operator platform(s) 128 that may be adjustable in elevation (height) to permit an operator(s) to ergonomically stand on the platform to load and unload containers between the end of the conveyor section 112 and a stack of containers (not shown) in the trailer 104. In this manner, the material handler facilitates the efficient unloading of the trailer or shipping container.

It should be understood that various changes and modifications to the embodiments described herein will be apparent to those skilled in the art. Such changes and modifications can be made without departing from the spirit and scope of the present disclosure and without diminishing its intended advantages. It is therefore anticipated that all such changes and modifications be covered by the instant application.

What is claimed is:

1. A conveying apparatus comprising:
a material-handler including
at least one conveying assembly for exchanging containers with a free end of an extendable conveyor to facilitate the transfer of containers between an operator and the extendable conveyor,
at least one drive mechanism for moving the material handler over a surface in response to control signals; and
a compliant hitch mechanism removably connecting said material handler to, and applying a driving force for, the free end of the extendable conveyor, the compliant hitch mechanism including a pin-and-hitch assembly to ensure no side loading of the extendable conveyor.

2. The conveying apparatus according to claim 1, wherein said conveying assembly includes:
at least one adjustable conveyor having a driven belt to transport containers thereon, said adjustable conveyor having a free end adjacent an operator location, where a position of the free end of the adjustable conveyor is adjusted by the operator; and
a mid-conveyor having a driven surface suitable to exchange containers with said at least one adjustable conveyor.

3. A conveying apparatus comprising:
a material-handler including
at least one conveying assembly for exchanging containers with a free end of an extendable conveyor to facilitate the transfer of containers between an operator and the extendable conveyor, the conveying assembly including at least one adjustable conveyor having a driven belt to transport containers thereon, said adjustable conveyor having a free end adjacent an operator location, where a position of the free end of the adjustable conveyor is adjusted by the operator; and a mid-conveyor having a driven surface suitable to exchange containers with said at least one adjustable conveyor, wherein said conveying assembly further includes:
an inclined belt conveyor operatively coupled to the free end of the extendable conveyor, and suitable for the unassisted exchange of containers between the extendable conveyor and the inclined belt conveyor; and
a transfer conveyor, operatively attached to and positioned at an upper end of the inclined belt conveyor, the transfer conveyor suitable for transporting containers between the inclined belt conveyor and the mid-conveyor
at least one drive mechanism for moving the material handler over a surface in response to control signals, and
a compliant hitch mechanism removably connecting said material handler to, and applying a driving force for, the free end of the extendable conveyor.

4. The conveying apparatus according to claim 2, wherein the at least one adjustable conveyor includes a slewing conveyor section coupled to a frame of the material handler for pivotal movement about a generally vertical axis and for pivotal movement about a generally horizontal axis, and where an opposing free end is shaped for the exchange of containers by an operator, the slewing conveyor section can be moved from side-to-side by pivoting the slewing conveyor section about the vertical axis and moved up and down by pivoting the slewing conveyor section about the horizontal axis independent of the slewing conveyor section.

5. The conveying apparatus according to claim 1, wherein said material handler includes an operator platform.

6. The conveying apparatus according to claim 1, wherein said pin-and-hitch assembly comprises:
a first hitch assembly, including a vertical pin, attachable to the free end of the extendable conveyor; and
a second hitch assembly, attachable to the material handler, said second hitch including an a generally horizontal arcuate slot therein for receiving said vertical pin,
wherein the second hitch assembly, in response to powered movement of the material handler, applies a horizontal force to the pin in a direction parallel with a longitudinal axis of the extendable conveyor, thereby removably connecting the material handler to the extendable conveyor and moving the free end of the extendable conveyor in response to movement of the material handler.

7. The conveying apparatus according to claim 1, wherein said drive mechanism includes a pair of drive wheels, each capable of being independently controlled and driven.

8. A compliant hitch kit for interfacing a material handler to a free end of an extendable conveyor, comprising:
a first hitch assembly, including a vertical pin, attachable to the free end of the extendable conveyor; and a second hitch assembly attachable to the material handler, said second hitch including a generally horizontal arcuate slot therein for receiving said vertical pin, wherein the second hitch, in response to movement of the material handler, applies only a horizontal force to the pin in a direction parallel with a longitudinal axis of the extendable conveyor, thereby extending or retracting the free end of the extendable conveyor in response to movement of the material handler.

9. The compliant hitch kit according to claim 8, wherein said first hitch assembly further includes a conveying assembly for interfacing an adjustable conveyor of the material handler with said extendable conveyor, said conveying assembly serving to move containers between the free end of the extendable conveyor and the adjustable conveyor of the material handler.

10. The compliant hitch kit according to claim 9, wherein said conveying assembly includes:
   an inclined belt conveyor for moving containers;
   a transfer conveyor for transporting containers between said inclined belt conveyor and said adjustable conveyor of the material handler; and
   a side guide, operatively associated with said transfer conveyor to align containers for exchange with said adjustable conveyor.

11. The compliant hitch kit according to claim 8, wherein said pin of the first hitch assembly has a usable length of at least 25.4 cm (10 inches) and the radius of the arcuate slot of the second hitch assembly approximates the turning radius of the material handler.

12. The compliant hitch kit according to claim 8, further including an electrical control interface suitable for connecting control electronics of the material hander to the extendable conveyor so that the material handler controls at least one operation of the extendable conveyor.

13. The compliant hitch kit according to claim 12, further including:
   at least one cable providing a source of power to the material handler and for interconnecting the control electronics of the material hander to the extendable conveyor; and
   at least one cable reel for winding and unwinding the at least one cable, where the motor-driven cable reel operates automatically, in response to movement of the material handler, to unwind and wind the at least one cable at the same time the extendable conveyor is extended and retracted.

14. A system for operating a conveying apparatus having an extendable conveyor comprising:
   a material-handler including,
      at least one conveying assembly for exchanging containers with a free end of the extendable conveyor to facilitate the transfer of containers between an operator using the material handler and the extendable conveyor, and
      at least one drive mechanism for moving the material handler over a surface in response to control signals, and
      a compliant hitch mechanism removably connecting said material handler to, and providing driving force for, the free end of the extendable conveyor;
   said conveying assembly including at least one adjustable conveyor having a driven belt to transport containers thereon, said adjustable conveyor having a free end adjacent an operator location, where a position of the free end of the adjustable conveyor is adjustable by the operator, and a mid-conveyor having a driven surface suitable to exchange containers with said at least one adjustable conveyor, wherein the at least one adjustable conveyor includes a slewing conveyor section coupled to a frame of the material handler for pivotal movement about a generally vertical axis and for pivotal movement about a generally horizontal axis, and where an opposing free end is shaped for the exchange of containers by an operator, the slewing conveyor section being movable from side-to-side by pivoting the slewing conveyor section about the vertical axis, and movable vertically by pivoting the slewing conveyor section about the horizontal axis independent of the adjustable conveyor section;
   an inclined belt conveyor operatively coupled to the free end of the extendable conveyor, and suitable for the unassisted exchange of containers between the extendable conveyor and the inclined belt conveyor;
   a transfer conveyor, operatively attached to and positioned at an upper end of the inclined belt conveyor, the transfer conveyor suitable for transporting containers between the inclined belt conveyor and the mid-conveyor;
   at least one cable providing a source of power to the material handler and for interconnecting the control electronics of the material hander to the extendable conveyor; and
   at least one motor-driven cable reel for winding and unwinding the at least one cable, where the motor-driven cable reel operates automatically, in response to movement of the material handler, to unwind and wind the at least one cable at the same time the extendable conveyor is extended and retracted.

15. The system according to claim 14, wherein said material handler includes an operator platform.

16. The system according to claim 14, wherein said compliant hitch mechanism, includes:
   a first hitch assembly attachable to the free end of the extendable conveyor and including a vertical pin, and
   a second hitch assembly attachable to the material handler, said second hitch including an arcuate slot therein for receiving said vertical pin,
   wherein the second hitch, in response to powered movement of the material handler, applies a horizontal force to the pin in a direction parallel with a longitudinal axis of the extendable conveyor, thereby extending or retracting the free end of the extendable conveyor.

17. A material handler for use with a source of conveyed packages, comprising:
   at least one adaptable conveying assembly for exchanging containers with the source of conveyed packages;
   at least one drive mechanism for moving the material handler over a surface in response to control signals;
   a mechanism for connection of the material handler to the source of conveyed packages; and
   at least one cable providing a source of power to the material handler and interconnecting controls of the material hander to the source of conveyed packages.

18. The materials handler according to claim 17, wherein said adaptable conveying assembly includes:
   at least one adjustable conveyor having a driven belt to transport containers thereon, said adjustable conveyor having a free end adjacent an operator location, where a position of the free end of the adjustable conveyor is adjustable by the operator;
   a mid-conveyor having a driven surface suitable to exchange containers with said at least one adjustable conveyor, wherein the at least one adjustable conveyor includes a slewing conveyor section coupled to a frame of the material handler for pivotal movement about a generally vertical axis and for pivotal movement about a generally horizontal axis, and where an opposing free end is shaped for the exchange of containers by an operator, the slewing conveyor section being movable from side-to-side by pivoting the slewing conveyor section about the vertical axis, and movable vertically by pivoting the slewing conveyor section about the horizontal axis independent of the adjustable conveyor section; and an inclined belt conveyor operatively coupled to the source of conveyed packages, and suitable for the unassisted exchange of packages between the source of conveyed packages and the inclined belt conveyor.

19. The materials handler according to claim 17, further including at least one motor-driven cable reel for winding and unwinding the at least one cable.

20. The materials handler according to claim 19, wherein the motor-driven cable reel operates automatically, in response to movement of the source of conveyed packages, to unwind and wind the at least one cable.

21. The materials handler according to claim 17, further including a compliant hitch mechanism removably connecting said material handler to, and providing driving force for, a free end of the source of conveyed packages.

* * * * *